(12) United States Patent
Rogers

(10) Patent No.: US 10,508,763 B2
(45) Date of Patent: Dec. 17, 2019

(54) COMBINATION GAS PULSATION DAMPENER, CROSS AND STRAINER

(71) Applicant: Performance Pulsation Control, Inc., Richardson, TX (US)

(72) Inventor: John Thomas Rogers, Garland, TX (US)

(73) Assignee: Performance Pulsation Control, Inc., Richardson, TX (US)

( * ) Notice: Subject to any disclaimer, the term of this patent is extended or adjusted under 35 U.S.C. 154(b) by 105 days.

(21) Appl. No.: 15/807,355

(22) Filed: Nov. 8, 2017

(65) Prior Publication Data

US 2018/0128410 A1 May 10, 2018

Related U.S. Application Data

(60) Provisional application No. 62/419,843, filed on Nov. 9, 2016.

(51) Int. Cl.
*F16L 55/04* (2006.01)
*F16L 55/053* (2006.01)
*B01D 29/11* (2006.01)
*B01D 35/02* (2006.01)
*F04B 11/00* (2006.01)
*F16L 55/027* (2006.01)

(52) U.S. Cl.
CPC ............ *F16L 55/053* (2013.01); *B01D 29/11* (2013.01); *B01D 35/02* (2013.01); *F04B 11/00* (2013.01); *F16L 55/02709* (2013.01)

(58) Field of Classification Search
CPC .......... F16L 55/053; F16L 55/054; F15B 1/10

USPC ..................................................... 138/26, 30
See application file for complete search history.

(56) References Cited

U.S. PATENT DOCUMENTS 2,804,884 A * 9/1957 Granville .................. F15B 1/20
138/30
3,868,972 A * 3/1975 Zirps ......................... F15B 1/18
138/30
4,032,265 A * 6/1977 Miller ................. F04B 11/0016
137/565.34
4,186,776 A * 2/1980 Burton .................... F15B 1/165
138/30

(Continued)

FOREIGN PATENT DOCUMENTS

CN      102235401 B      5/2015
WO      2006099622 A2    9/2006

(Continued)

OTHER PUBLICATIONS

Pulsafeeder, "Installation and Operation Manual, Chargeable Dampener Models", 2014, 12 pages.

(Continued)

*Primary Examiner* — Patrick F Brinson

(57) ABSTRACT

An apparatus and method provide for a hybrid pulsation dampener. The hybrid pulsation dampener includes an inlet, a flow-through reactive dampener, a gas charged pulsation dampener, and an outlet. The inlet receives a fluid. The flow-through reactive dampener dampens the received fluid. The gas charged pulsation dampener further dampens the dampened fluid as the received fluid flows through the flow-through reactive dampener. The outlet discharges the further dampened fluid.

20 Claims, 9 Drawing Sheets

(56) References Cited

U.S. PATENT DOCUMENTS

| | | | | |
|---|---|---|---|---|
| 4,408,635 | A | * | 10/1983 | Packer .................... F15B 1/106 138/30 |
| 4,497,388 | A | * | 2/1985 | Dexter .................. F16L 55/053 138/30 |
| 4,514,151 | A | | 4/1985 | Anders et al. |
| 4,872,486 | A | * | 10/1989 | Sugimura ................. F15B 1/10 138/30 |
| 5,868,168 | A | * | 2/1999 | Mott ..................... F16L 55/053 138/26 |
| 7,542,875 | B2 | | 6/2009 | Rogers |
| 8,539,984 | B2 | * | 9/2013 | Baltes ...................... F15B 1/12 138/30 |
| 9,249,915 | B2 | | 2/2016 | Rogers |
| 9,695,970 | B2 | | 7/2017 | Rogers et al. |
| 9,790,934 | B2 | | 10/2017 | Mathiak et al. |
| 2002/0139426 | A1 | * | 10/2002 | Kippe ................... F16L 55/053 138/30 |
| 2012/0189477 | A1 | * | 7/2012 | Rogers ................ F04B 11/0091 417/540 |

FOREIGN PATENT DOCUMENTS

| | | |
|---|---|---|
| WO | 2012100192 A1 | 7/2012 |
| WO | 2013006863 A1 | 1/2013 |
| WO | 2015054425 A1 | 4/2015 |

OTHER PUBLICATIONS

International Search Report dated Jan. 19, 2018 in connection with International Patent Application No. PCT/US2017/060677, 2 pages.
Written Opinion of the International Searching Authority dated Jan. 19, 2018 in connection with International Patent Application No. PCT/US2017/060677, 8 pages.

* cited by examiner

COMBINATION GAS PULSATION DAMPENER, CROSS AND STRAINER

CROSS-REFERENCE TO RELATED APPLICATIONS

This application claims the benefit of the filing date of U.S. Provisional Patent Application No. 62/419,843 entitled "COMBINATION GAS PULSATION DAMPENER, CROSS AND STRAINER" filed Nov. 9, 2016, the content of which is hereby incorporated by reference.

TECHNICAL FIELD

The present application relates generally to the operation of reciprocating fluid transfer systems and, more specifically, to providing a hybrid pulsation dampener combining a gas charged pulsation dampener (PD), a flow-through cross, and a reactive dampener.

BACKGROUND

Pulsation control in fluid transfer systems is in constant need of improvement. Among the improvements desirable are greater flexibility in application for a particular pulsation dampener and integration with other elements of an overall pump system.

SUMMARY

A gas charged pulsation dampener and flow-through cross reactive discharge dampener producing different dampening methods are employed in a modified pulsation dampener, producing higher performance. The gas charged pulsation dampener can be mounted with bolts or welded to the flow-through cross reactive dampener.

In a first embodiment, an apparatus provides for a hybrid pulsation dampener. The hybrid pulsation dampener includes an inlet, a flow-through reactive dampener, a gas charged pulsation dampener, and an outlet. The inlet receives a fluid. The flow-through reactive dampener dampens the received fluid. The gas charged pulsation dampener further dampens the dampened fluid as the received fluid flows through the flow-through reactive dampener. The outlet discharges the further dampened fluid.

In a second embodiment, an apparatus provides for a hybrid pulsation dampener. The hybrid pulsation dampener includes an inlet, a flow-through reactive dampener, a gas charged pulsation dampener, a strainer, and an outlet. The inlet receives a fluid. The flow-through reactive dampener dampens the received fluid. The gas charged pulsation dampener further dampens the dampened fluid as the received fluid flows through the flow-through reactive dampener. The strainer additionally decreases pressure pulsations in the further dampened fluid. The outlet discharges the further dampened fluid.

In a third embodiment, a method provides for a process using a hybrid pulsation dampener. The method includes receiving, by an inlet of the hybrid pulsation dampener, a fluid; dampening, by a flow-through reactive dampener of the hybrid pulsation dampener, the received fluid; further dampening, by a gas charged pulsation dampener of the hybrid pulsation dampener, the dampened fluid as the received fluid flows through the flow-through reactive dampener; and discharging, by an outlet of the hybrid pulsation dampener, the further dampened fluid.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; and the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
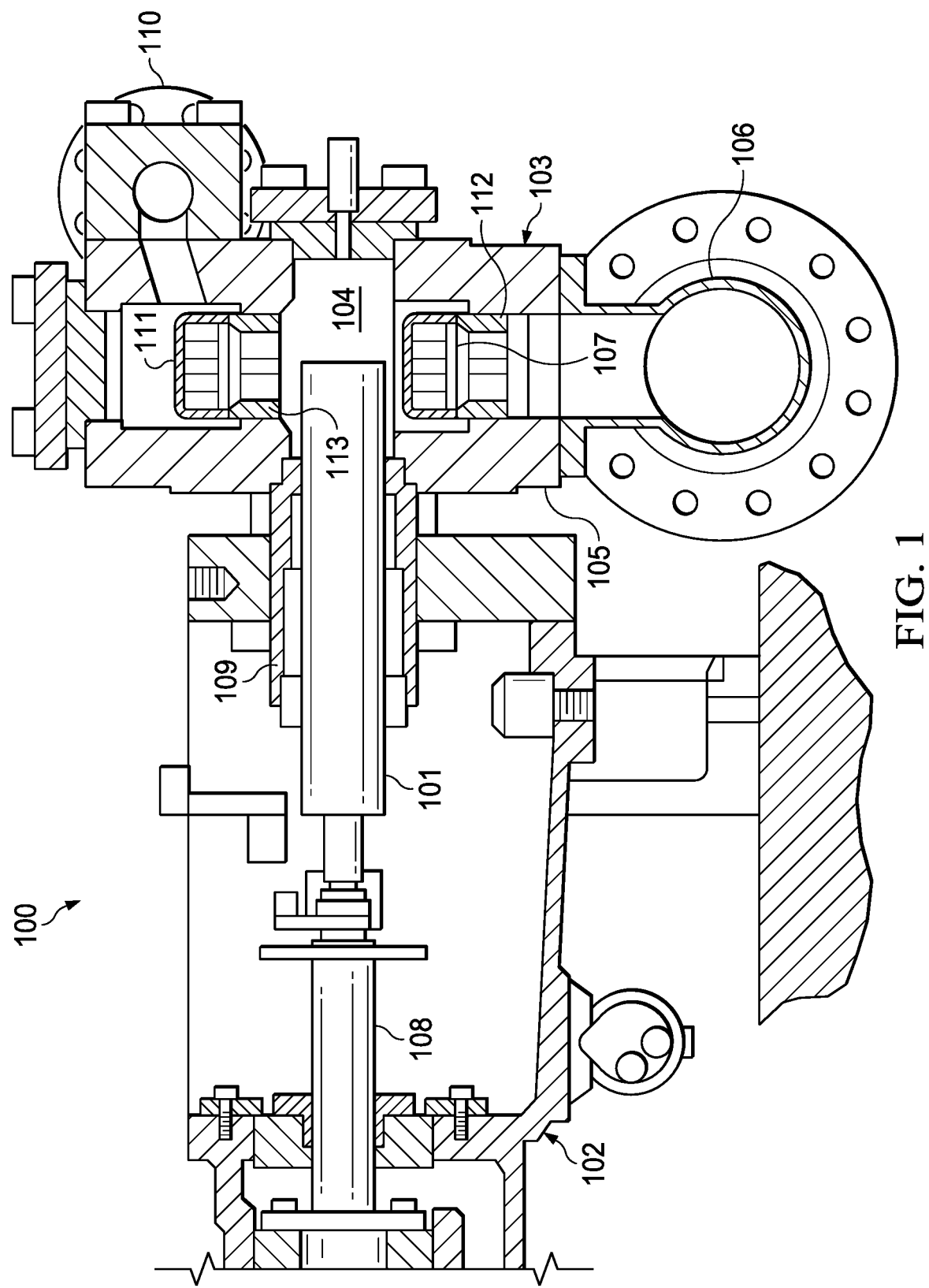
FIG. 1 is a cross sectional, somewhat simplified schematic view of a reciprocating pump system employed with a hybrid pulsation dampener according to an exemplary embodiment of the present disclosure.

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged hybrid pulsation dampener that has an inlet, outlet, flow-through cross reactive discharge dampener, and a gas charged pulsation dampener and can be used to control or partially control pulsation amplitudes.

Reciprocating systems, such as reciprocating pump systems and similar equipment, operate in many types of cyclic hydraulic applications. For example, reciprocating mud pump systems are used to circulate the mud or drilling fluid on a drilling rig. Pressure peaks within the pumped fluid accelerate, with each pulsation, the deterioration of the pump, the pump's fluid end expendable parts, and equipment downstream from the pump. Failure to control such pressure peaks inevitably affect the operating performance and operational life of the pump, pump fluid end expendable parts and all upstream or downstream components.

Pulsation control equipment is typically placed immediately upstream or downstream from a reciprocating pump, often with a relative size and configuration proportional to the volume of desired fluid displacement per stroke of the pump and the maximum allotted magnitude of the pressure peaks that may be experienced by the pump system during each pulsation. Pulsation control equipment thus aids in reducing pump loads and minimizing pulsation amplitudes to the pump, the pump's fluid end expendable parts and to equipment upstream or downstream. As a result, pulsation control equipment increases the relative operating performance and life of the pump, the pump's fluid end expendable parts and any equipment upstream or downstream from the pump.

Different pulsation dampening systems have been developed, including gas charged dampeners. One common type of pulsation dampener is a hydro-pneumatic or gas-charged pressure vessel containing compressed air or nitrogen and a bladder (or bellows) that separates the process fluid from the gas charge. Most commonly cylindrical or roughly spherical, gas charged pulsation dampeners may be either flow through or appendage type devices. To optimize the pulsation dampening effect, it is often preferable that the pulsation dampener be installed as close as possible to the pump discharge. At such locations, however, the presence of the pulsation dampener may interfere with installation of other system components, such as a strainer or cross. In addition, the gas-charged pulsation dampener design typically requires that the gas charge be slightly below the normal system pressure, and that the pulsation dampener be properly sized for the system. An undersized dampener cannot adequately compensate for pressure and flow fluctuations, while an oversized dampener will act as an accumulator, storing too much fluid and causing slow stabilization and delayed response to system changes.

Reactive pulsation dampeners rely on compressibility of the process fluid contained within dampener enclosure to dampen pump pulsations by acting as a "liquid spring." Generally spherical in shape and operating best when installed and used in the flow through configuration, reactive dampeners contain the required volume of the liquid being pumped to achieve a desired level of performance. These pulsation dampeners dampen both flow and acceleration pulsations generated by the reciprocating pump, with the contained process fluid absorbing a high percentage of flow variation pulsation energy. For example, pressure drop piping may dampen high frequency acceleration pulsations caused by pump valve(s) opening and closing based on a water hammer effect. Sizing based on water-based fluids being pumped, with all pump generated pulsation energy entering unit to produce more effective dampening than an appendage dampener. Pulsation levels are virtually constant over entire pump pressure operating range, with lower pulsation energy causing less pipe vibration and associated noise such that all components affected by pressure will have better fatigue life. No gas charging or bladder change out is required, making a well-designed reactive dampener largely maintenance free, and pulsation dampening is significantly more efficient versus bladder dampeners. Reactive dampeners may be used for both discharge and suction applications.

Both types of dampeners, however, involve tradeoffs and constraints with regard to performance, and require mounting at locations in the overall pumping system that may be inconvenient for a variety of reasons.

FIG. 1 is a cross sectional, somewhat simplified schematic view of a reciprocating pump system employing a pump suction and/or discharge pulsation control product including a gas charged pulsation dampener mounted to a flow-through cross reactive dampener according to an exemplary embodiment of the present disclosure. Pump system 100 may employ a reciprocating pump of a type well-known and commercially available. The pump within pump system 100 is configured to reciprocate one or more plungers or pistons 101 (only one shown in FIG. 1). Each piston or plunger is preferably connected by a suitable rotatable crankshaft or eccentric (not shown) mounted in a suitable "power end" housing 102. Power end housing 102 is connected to a fluid end structure 103 configured to have a separate pumping chamber 104 for each piston or plunger 101. Pumping chamber 104 is exposed to its respective piston or plunger 101. One such chamber 104 is shown in FIG. 1.

More specifically, FIG. 1 illustrates a simplified cross-sectional view through a typical pumping chamber 104. Fluid end 103 includes housing 105. Pumping chamber 104 receives fluid from inlet manifold 106 by way of a conventional poppet type inlet or suction valve 107 (only one shown). Piston or plunger 101 projecting at one end into chamber 104 connects to a suitable crosshead mechanism, including crosshead extension member 108. Crosshead extension member 108 is operably connected to a crankshaft or eccentric (not shown) in a known manner. Piston or plunger 101 also projects through a conventional liner or through conventional packing 109, respectively. Each piston or plunger 101 is preferably configured to chamber 104. Each piston or plunger 101 is also operably connected to suction pump manifold 106 and discharge piping manifold 110 by way of a suitable suction valve 107 or discharge valve 111, as shown. Suction piping manifold 106 typically receives fluid from suction stabilizer (not shown in FIG. 1) or a suction piping with a suction stabilizer. Discharge piping manifold 110 typically discharges into a discharge dampener (not shown in FIG. 1). Valves 107 and 111 are of conventional design and typically spring biased to their respective closed positions. Valves 107 and 111 each also may include or be associated with removable valve seat members 112 and 113, respectively. Each of valves 107 and 111 may preferably have a seal member (not shown) formed thereon to provide fluid sealing when the valves are in their respective closed and seat engaging positions.

Those skilled in the art will recognize that the techniques of the present disclosure may be utilized with a wide variety of single and multi-cylinder reciprocating piston or plunger power pumps as well as possibly other types of positive displacement pumps. As one example, the number of cylinders of such pumps may vary substantially between a single cylinder and essentially any number of cylinders or separate pumping chambers. Those skilled in the art will also recognize that the complete structure and operation of a suitable pump system is not depicted or described herein. Instead, for simplicity and clarity, only so much of a pump system as is unique to the present disclosure or necessary for an understanding of the present disclosure is depicted and described.

Figure 2A:
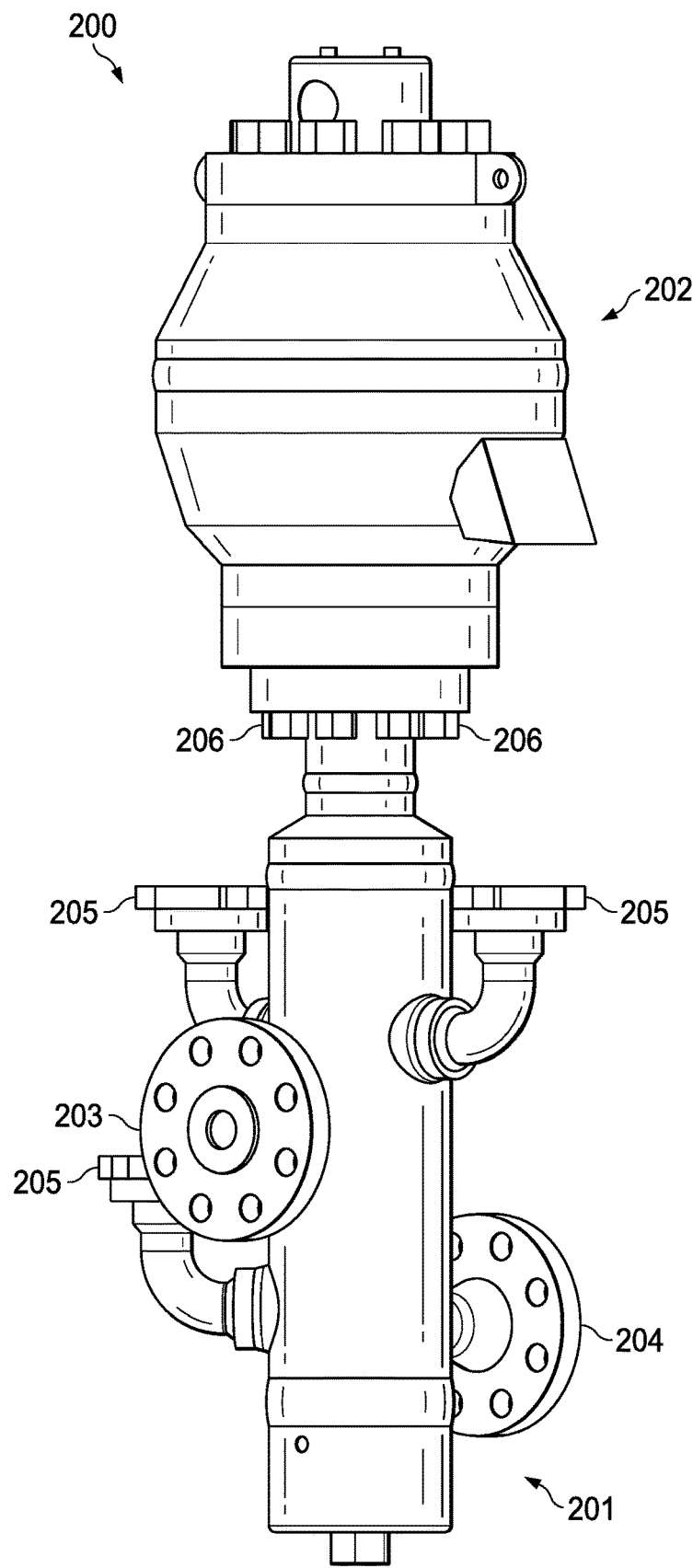
FIGS. 2A and 2B are an elevation view and a perspective view, respectively, of one possible hybrid pulsation dampener in accordance with embodiments of the present disclosure.
Figure 2B:
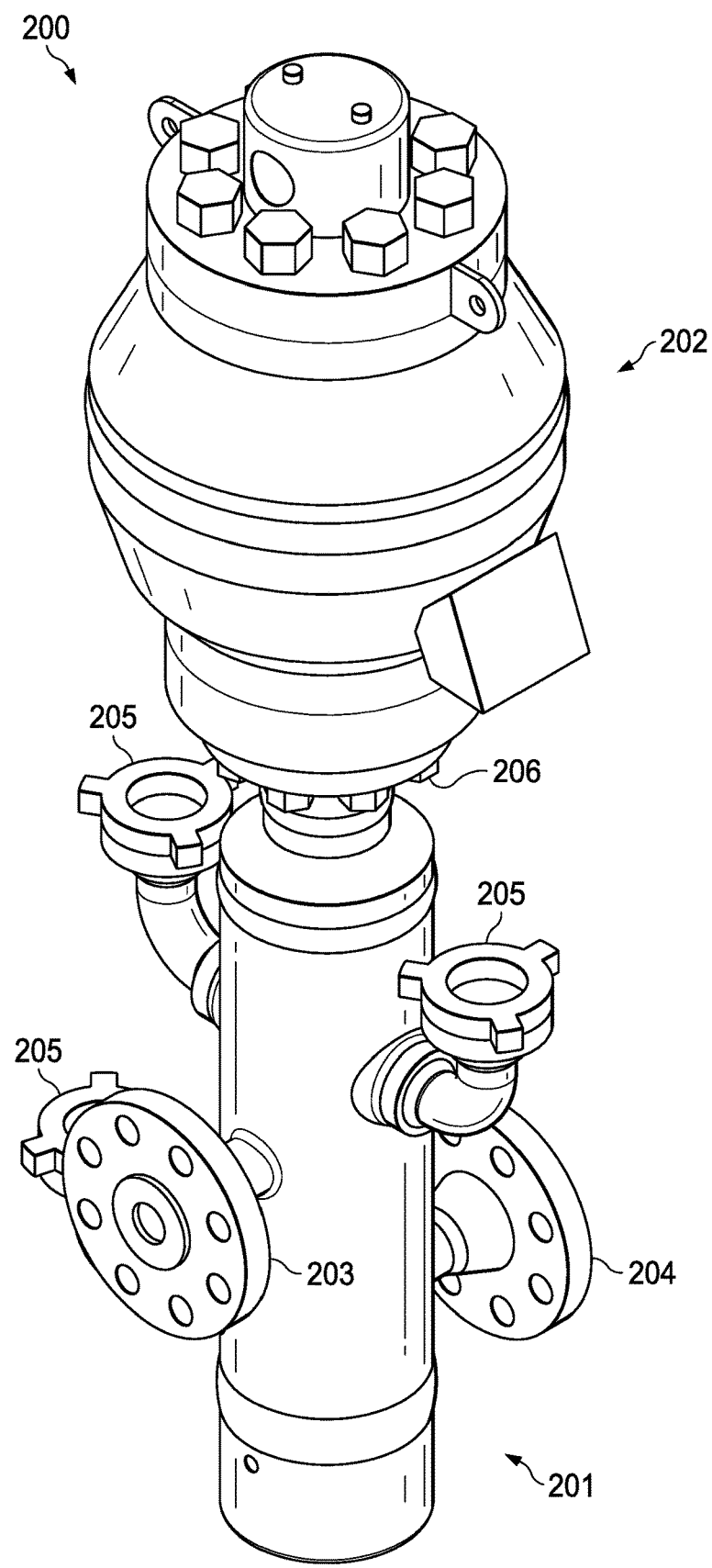

Conventional pump systems such as pump 100 shown in FIG. 1 typically include a discharge dampener system. FIGS. 2A and 2B are an elevation view and a perspective view, respectively, of one possible hybrid pulsation dampener 200 in accordance with embodiments of the present disclosure. A hybrid pulsation dampener 200 includes an elongate, cylindrical, flow-through combination cross and reactive discharge dampener 201, also referred to as a flow-through reactive dampener, for dampening high frequency acceleration pulsations and a gas charged pulsation dampener 202 for dampening pressure pulsations within a pumped fluid an inlet 203, and outlet 204, and a plurality of cross features 205. Hybrid pulsation dampener 200 receives "fluid" (which may be entirely liquid or which may include suspended solids—i.e., a slurry) at inlet 203. Hybrid pulsation dampener 200 includes an inlet 203 that is coupled in fluid communication with the discharge manifold 110 of pump system 100 either directly or by intervening piping (not shown), allowing all pumped fluid to enter hybrid pulsation dampener 200, becoming temporarily part of the material filling internal volume of the flow-through cross reactive discharge dampener 201. The fluid is received downstream from a pump or other device that causes pulsations within the fluid.

The flow-through cross reactive discharge dampener 201 may contain an internal (or external) pressure drop feature for dampening high frequency acceleration pulsations of the fluid caused by valve opening and closing in the pump system. An internal pressure drop feature may be provided in one or both of two ways: the changing direction of flow through flow path and the drop across the strainer tube may result in a pressure drop, or an external orifice or pressure drop may be added at an outlet of the flow-through cross reactive discharge dampener 201. The flow-through cross reactive discharge dampener 201 creates a resistance or pressure drop as a result of the fluid entering, passing through, and exiting a strainer tube and/or other internal pressure drop feature, which has a smaller inner diameter than the inner diameter of outlet 204. The flow-through cross reactive discharge dampener 201 dampens or lowers the pulsation amplitudes, and also reduces the higher frequency energies created by the pumping actions. A strainer, not visible in FIGS. 2A and 2B, is also preferably included in the hybrid pulsation dampener, within the interior of the flow-through cross reactive discharge dampener 201. The strainer tube is a cylinder with multiple small holes for trapping debris of a certain size and creating a small pressure drop feature.

A generally spherical gas charged pulsation dampener 202 is mounted to the flow-through reactive discharge dampener 201 in a manner to expose a membrane of the gas charged pulsation dampener 202 to the fluid flowing through the flow-through reactive dampener and allowing an internal volume of the gas charged pulsation dampener to compress and expand, further reducing pressure pulsations of the fluid. An additional benefit realized by mounting the gas charged dampener 202 as shown is that fluid entering the internal volume encounters or impacts the opposite side, causing the pulsation energy to more effectively interact with the membrane of the gas charged dampener. Whereas gas charged dampeners are normally mounted such that the fluid passes beneath the membrane, the mounting position and flow path in this embodiment enable the membrane to be more active. Moreover, the additional space for liquid volume inside the gas charged pulsation dampener 202, and in particular the extra volume is created when the membrane compresses, adds to the existing liquid volume of the flow-through reactive discharge dampener 201.

As illustrated in FIGS. 2A and 2B, the gas charged pulsation dampener 202 is mounted to the flow-through reactive dampener 201 using bolts 206. The membrane separates the fluid from the internal volume, a compressed gas, of the gas-charged pulsation dampener. Therefore, the compressed gas alternately compresses or expands in synchronization with the pump plunger absorbing or reducing the pressure pulsations from the pump in the fluid. All fluid then discharges through an outlet 204.

The hybrid pulsation dampener 200 may include a number of connection features 205, which can provide a pressure relief connection, a pressure gauge connection, and additional or alternative outlets to the hybrid pulsation dampener 200. For optimum pump protection in the event of a pressure relief event, the system pressure relief valve (not shown) is attached to the hybrid pulsation dampener in a manner ensuring the protection of the pump. The pressure relief valve connects to allow excess pressure to be removed from the hybrid pulsation dampener 200. A pressure gauge connection allows for monitoring of the internal pressures of the hybrid pulsation dampener 200. Additional or alternative outlets provide different connection options to the hybrid pulsation dampener 200 for different sizes or types of connection interfaces.

Figure 3A:
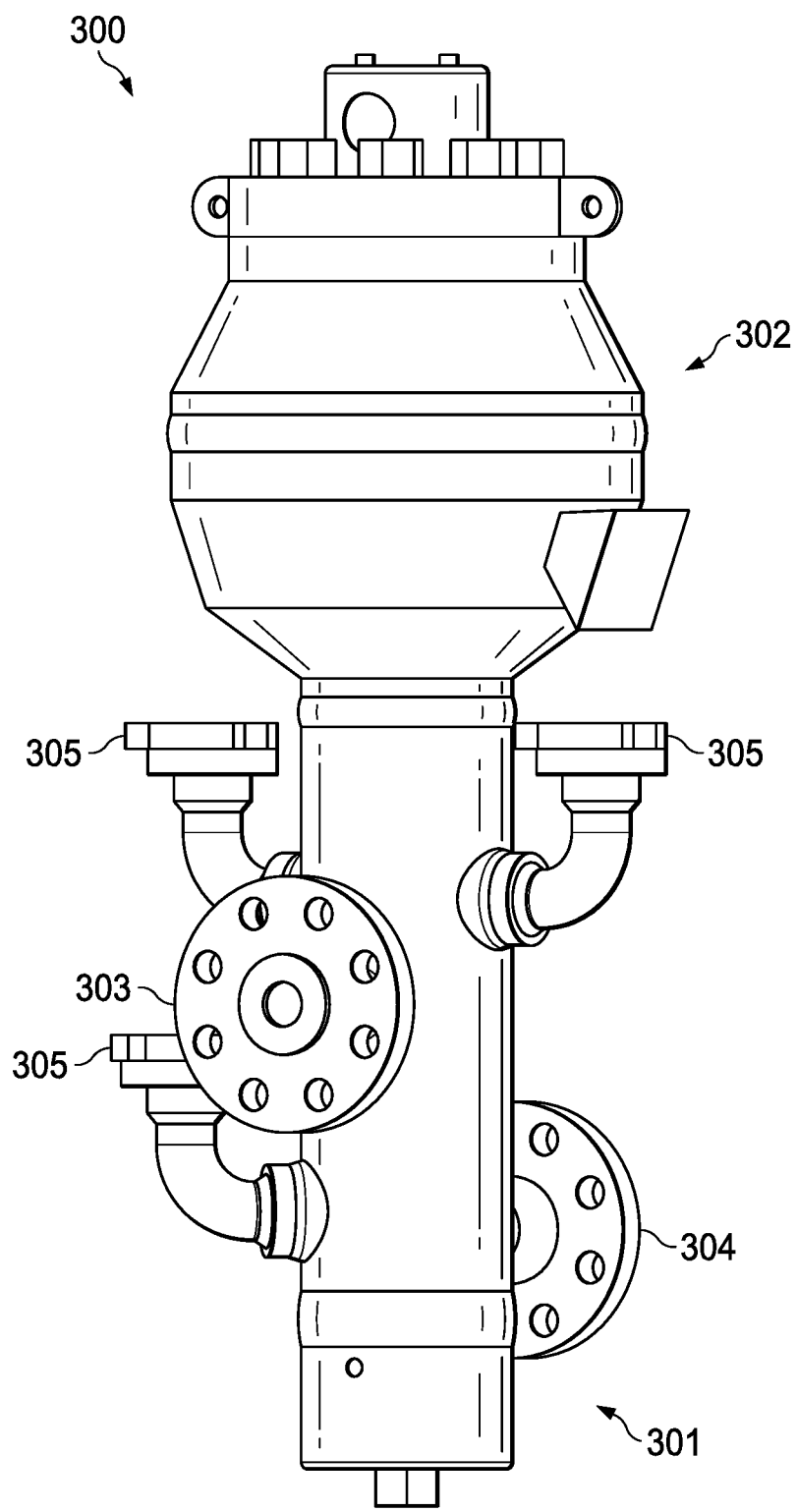
FIGS. 3A and 3B are elevation and perspective views, respectively, for an alternate possible hybrid pulsation dampener in accordance with embodiments of the present disclosure.
Figure 3B:
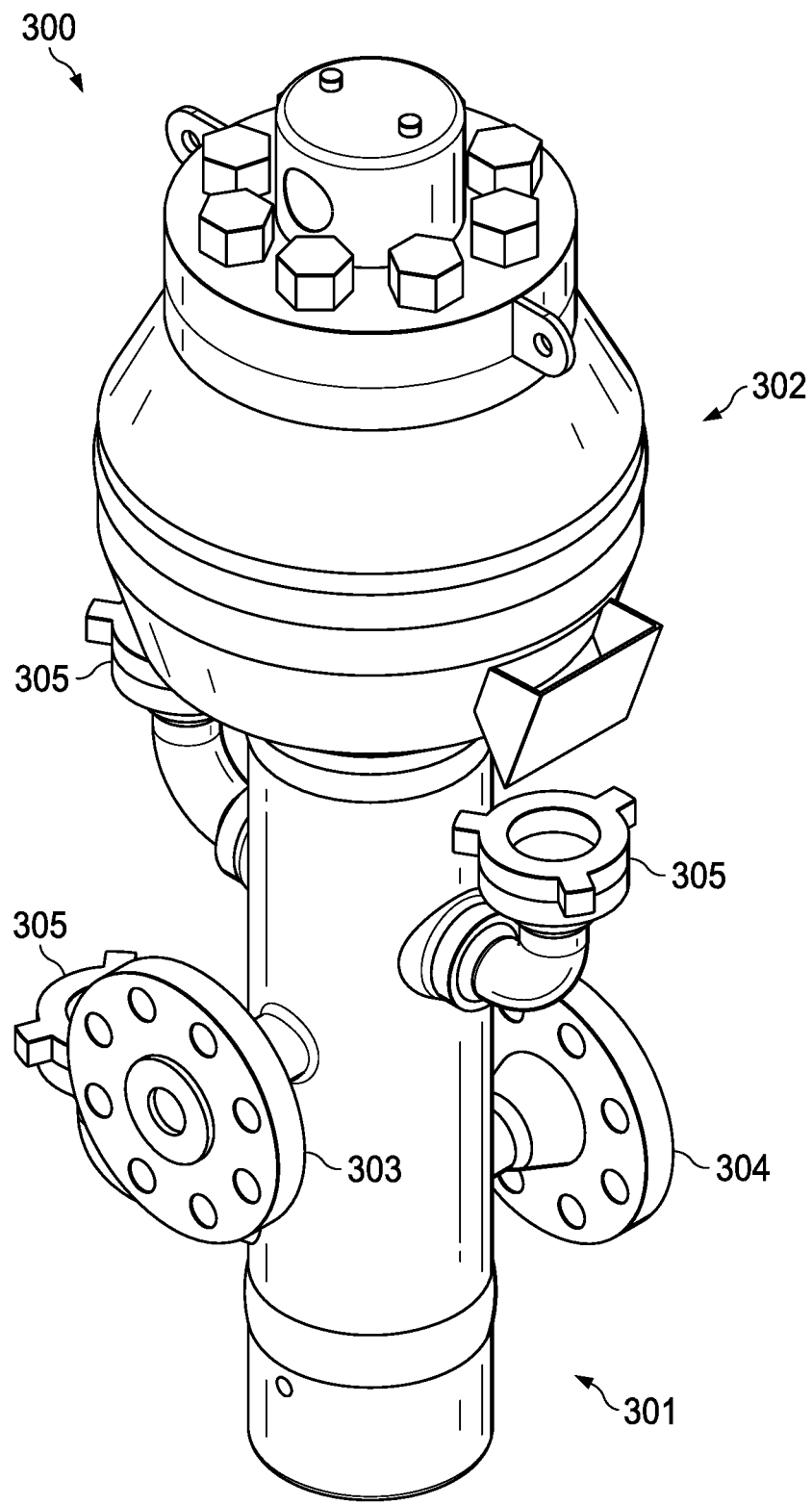

FIGS. 3A and 3B are elevation and perspective views, respectively, for an alternate possible hybrid pulsation dampener in accordance with embodiments of the present disclosure. Features shared with the embodiment of FIGS. 2A and 2B are not explicitly re-stated below, although those skilled in the art will understand that such features described above (or below) may be implemented in any embodiment of the present disclosure, unless the alternatives are described as mutually exclusive. The hybrid pulsation dampener 300 includes a flow-through cross reactive dampener 301, a gas charged pulsation dampener 302, an inlet 303, an outlet 304, and a plurality of cross features 305, each of which may be structured and which operate in like manner to the corresponding feature of the embodiment of FIGS. 2A and 2B. However, the configuration shown in FIGS. 3A and 3B employs a weld connection instead of bolts 206, eliminating the need for a narrowing connection between the flow-through cross reactive dampener 301 and the gas charged pulsation dampener 302. That is, instead of bolting the gas charged pulsation dampener 302 to the flow-through cross reactive dampener 301, the gas charged pulsation dampener 302 is welded to the flow-through cross reactive dampener 301. While welding makes the two components more difficult to separate, advantages in the maximum operating pressure and total height of the hybrid pulsation dampener 300 are achieved.

Figure 4:
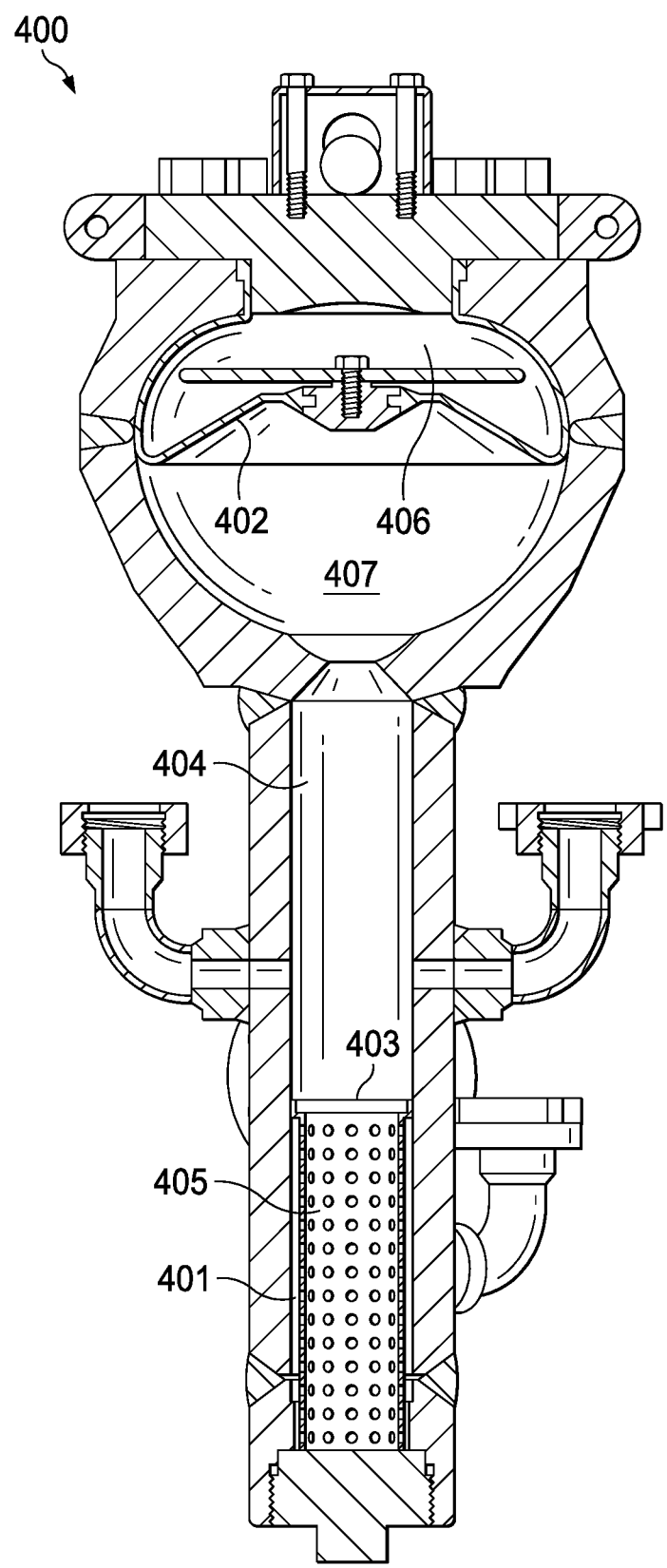
FIG. 4 illustrates a cross section of a hybrid pulsation dampener in accordance with embodiments of the present disclosure.

FIG. 4 illustrates a cross section of a hybrid pulsation dampener 400 in accordance with disclosed embodiments. The fluid enters the hybrid pulsation dampener 400 through an inlet, such as inlet 203 or 303 and enters chamber 404 traveling both upwards and downwards inside chamber 404. The annulus 401 is the area between the inner tube 403 and outer tube 404. The part of the fluid traveling upwards through chamber 404 enters into fluid chamber 407 to react with gas-filled diaphragm 402 and the liquid volume contained in chamber 407. This movement and reaction process creates small amounts of fluid moving in and out of chamber 407 as the reactions take place. Reactions with the diaphragm 402 cause the fluid volume of chamber 407 to rapidly increase and decrease. All of the fluid eventually travels into perforated cylinder 405 if present, then into annulus 401, and then out of the unit through one of the possible outlets, such as outlet 204 or 304.

The diaphragm 402 is located in the gas charged pulsation dampener. The gas charged pulsation dampener contains a pressure chamber 406 that is charged with pressurized gas, known as pre-charge, to an optimized pressure to minimize pressure variation of the fluid. The gas-charged pulsation dampener also contains a fluid chamber 407. As the fluid passes into the fluid chamber 407, pressure is exerted on the gas-filled diaphragm 402 causing the gas-filled diaphragm 402 to compress, which will cause an increase in the gas pressure chamber 406 and an increase in the liquid volume in chamber 407. The pressure is then dispersed across the volume of the pressurized gas in the pressure chamber 406. The pressure of the gas in the pressure chamber increases and reduces as the pressure in the fluid traveling through the pulsation dampener fluctuates, decreasing the pressure variance across the pulsation dampener. Increasing and decreasing the volumes of the gas pressure chamber 406 and the liquid chamber 407 reduces the amount of pressure variation in the fluids traveling through the pulsation dampener.

In embodiments where the hybrid pulsation dampener 400 is connected to a pump that causes pulsations, the fluids entering the fluid chamber 407 transmit pressure pulses onto the diaphragm 402 that transmits to the gas contained in the pressure chamber 406. That is, a small amount of fluid travels into the fluid chamber 407 from the chamber 404. The small amount of fluid creates an increase in pressure in the fluid chamber 407 that interacts with the gas-filled elastomeric diaphragm 402. Fluid will pass in and out of the fluid chamber 407. The fluid then travels downward into the center of inner tube 403, if present, then into annulus 401, and then out of the unit in one of many possible outlets.

In certain embodiments, a strainer (perforated cylinder) 405 is located at a lower portion of the inner tube 403. While the main feature of strainer 405 is to filter solids, it may also act as an additional pressure drop device decreasing the pressure pulsations. The strainer 405 may further cause the flow to divert and converge before exiting the pulsation dampener through the outlet. The size, shape, and amount of the holes in the strainer 405 are determined based on use type. Increasing the pressure in the pressure chamber 406 and increasing the liquid volume of chamber 407 of the pulsation dampener decreases the variation of pressure experienced in the fluid at the outlet.

The combination of dampening methods employed by the hybrid pulsation dampener depicted in FIGS. 2A-2B, 3A-3B and 4 provides more than merely additive pulsation dampening.

Figure 5:
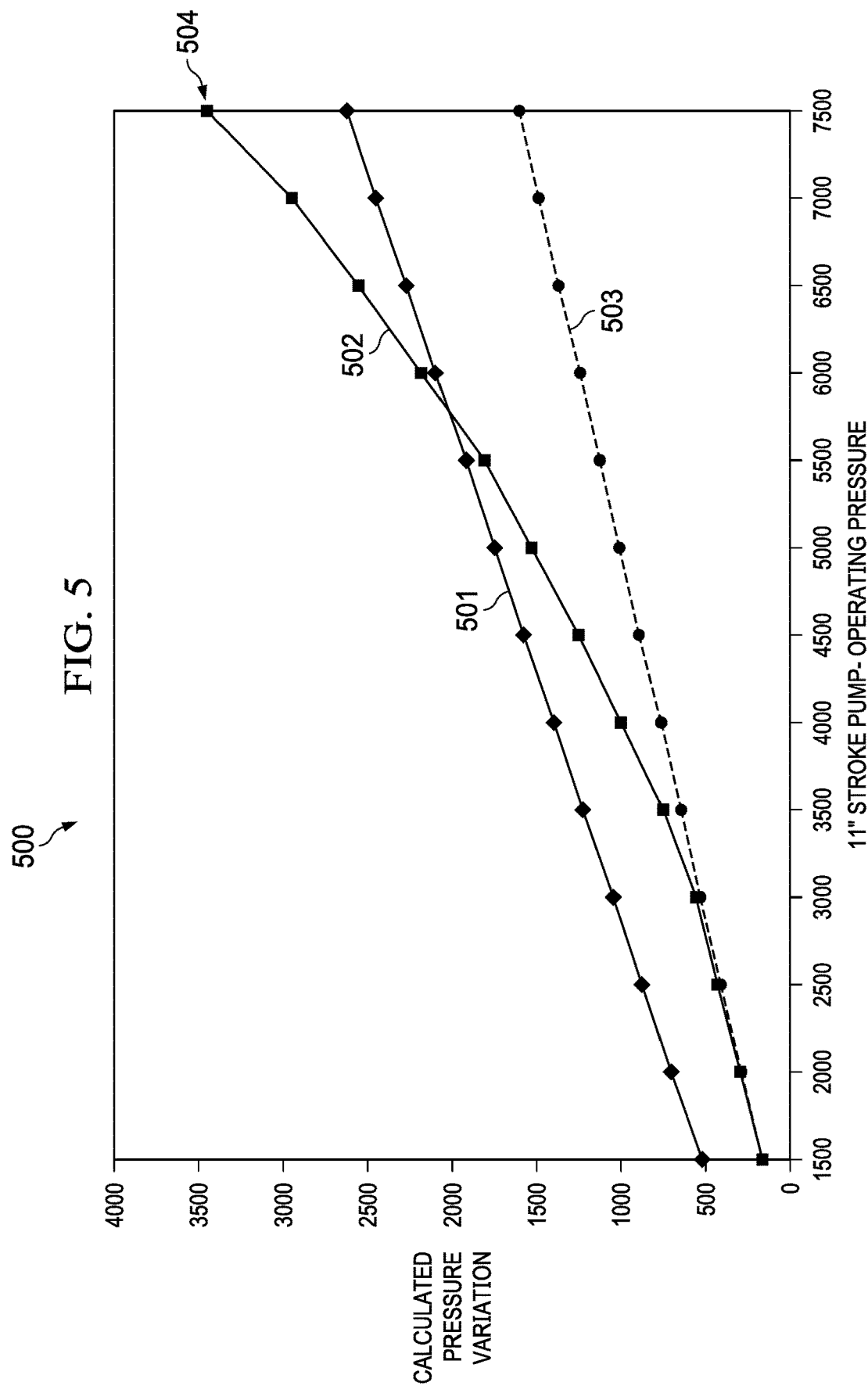
FIG. 5 is a graph illustrating the benefits of the hybrid pulsation dampener in accordance with embodiments of the present disclosure.

FIG. 5 is a graph 500 illustrating the benefits of the hybrid pulsation dampener in accordance with embodiments of the present disclosure. The graph 500 includes a pressure pulsation performance curve 501 (solid line with small diamond data point indicators) for a reactive discharge dampener, a pressure pulsation performance curve 502 (solid line with large square data point indicators) for a gas charged pulsation dampener, and a pressure pulsation performance curve 503 (dashed line with large circular data point indicators) for a hybrid pulsation dampener 503. The same pump displacement is employed for evaluating the performance of all three dampener systems. The optimized gas pre-charge pressure used for both the gas and hybrid dampener systems is based on 75% of the system operating pressure.

Normal volume variation of fluid traveling through a system is around 23%. The pressure variation of the fluid assumed to be approximately double the volume variation at around 46%. Notably, increasing the volume of the pressure chamber 407 has a multiplying effect on the pressure reduction of the fluid due to the compressibility of the fluid in the pressure chamber 406.

The pressure chamber 406 is filled with pressurized gas to a pressure suitable for dampening pulsations at the operating pressure. For the diaphragm to reduce the pressure pulsations, the pre-charge must be less than the operating pressure. For systems with fluctuating operating pressures, the pre-charge is optimally set based upon the low end of the operating pressure range. However, better performance is achieved as the pre-charge gets closer to the constant or minimum operating pressure. A pre-charge set too low decreases the effectiveness of the dampening. A 1500 pounds per square inch (PSI) pre-charge is employed as applicable for each of the performance curves of FIG. 5.

As illustrated in FIG. 5, the isolated gas charged pulsation dampener operates at a greater efficiency or a lower pressure variation than the isolated reactive pressure dampener. The gas charged pulsation dampener pressure pulsation performance curve 502 decreases ineffectiveness as the operating pressure increases to a point where the reduction of the pressure pulsation by gas-filled diaphragm 402 is negligible, at point 504. The effectiveness of the reactive discharge dampener pressure pulsation performance curve 501 is linear with respect to the operating pressure. Thus, at the high end of the operating range, the isolated flow-through reactive dampener operates at a greater efficiency or lower pressure variation than the gas charged pulsation dampener.

While the effectiveness of the gas charged pulsation dampener pressure pulsation performance curve 502 decreases as the operating pressure increases, that same loss of effectiveness from the gas charged pulsation dampener is not experienced in the hybrid pulsation dampener pressure pulsation performance curve 503. There is substantially no loss of efficiency in the hybrid pulsation dampener at the high end of the operating range of the pump due to the efficiency loss normally experience by an gas charged pulsation dampener operating without being combined with the flow-through pulsation dampener. In other words, the hybrid pulsation dampener receives the benefits of the reduced pulsations of the gas charged pulsation dampener throughout the operating range.

Figure 6:
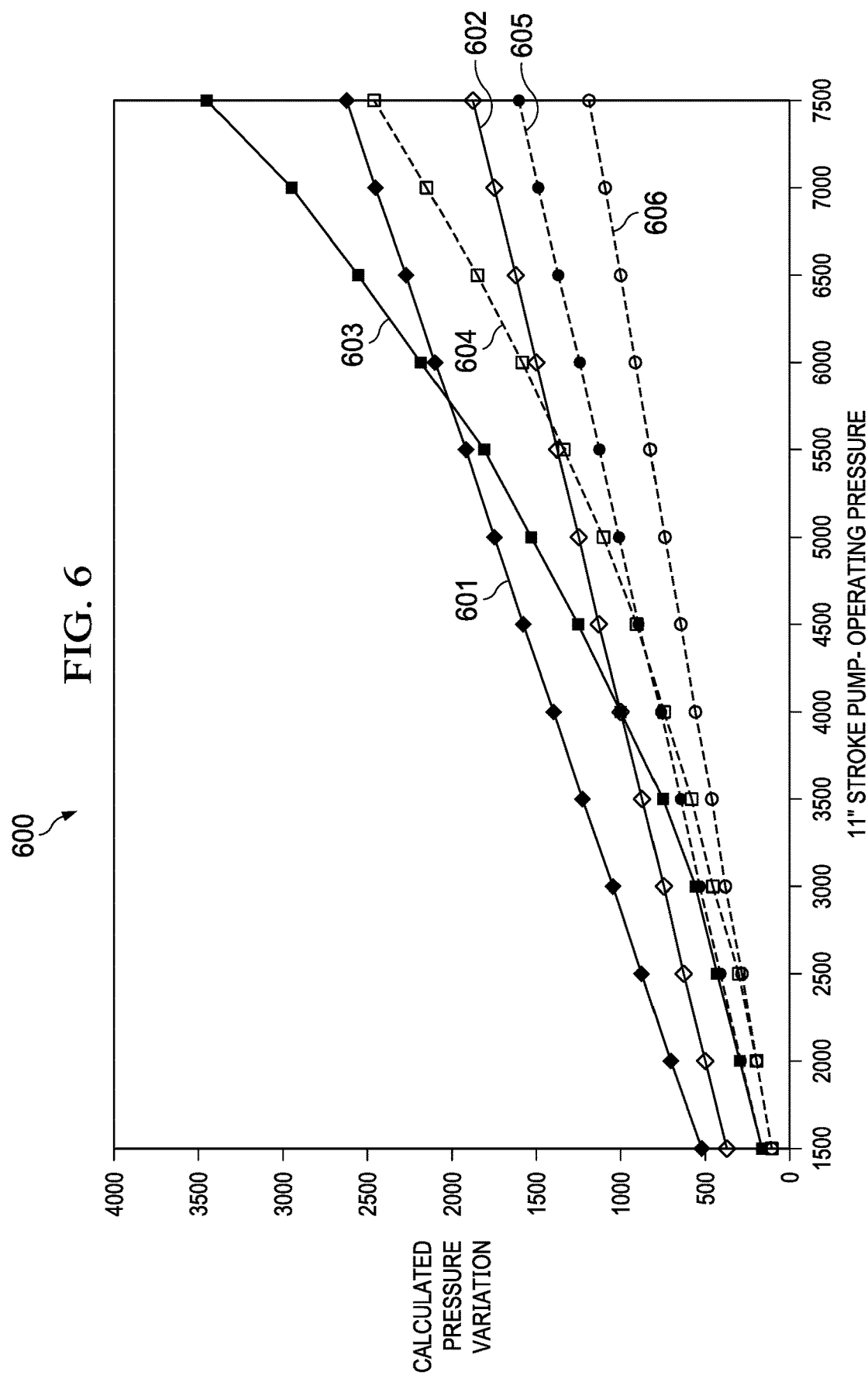
FIG. 6 is a graph illustrating the benefits of hybrid pulsation dampeners with different piston lengths in accordance with embodiments of the present disclosure.

FIG. 6 is a graph illustrating the benefits of hybrid pulsation dampeners in accordance with embodiment of the present disclosure when used for pump systems with different displacements or piston diameters. As with the plots of FIG. 5, the same pre-charge is employed for all devices, as applicable. The graph 600 includes pressure pulsation performance curves 601, 602 for a reactive discharge dampener, pressure pulsation performance curves 603, 604 for a gas charged pulsation dampener, and pressure pulsation performance curves 605, 606 for a hybrid pulsation dampener. Performance curve 601 (solid line with small, filled diamond data point indicators) and performance curve 602 (solid line with small, hollow diamond data point indicators) correspond respectively to use of the respective dampener with a higher displacement pump (e.g., one with a 6.5 inch piston) and a lower displacement pump (e.g., one with a 5.5 inch piston). Likewise, performance curve 603 (solid line with large, filled square data point indicators) and performance curve 605 (dashed line with large, filled circular data point indicators) each correspond to use of the respective dampener with a higher displacement pump, while performance curve 604 (dashed line with large, hollow square data point indicators) and performance curve 606 (dashed line with large, hollow circular data point indicators) correspond to use of the respective dampener with a lower displacement pump. As shown, decreasing displacement (e.g., the piston size) also decreases the pressure variation in the fluid.

Figure 7:
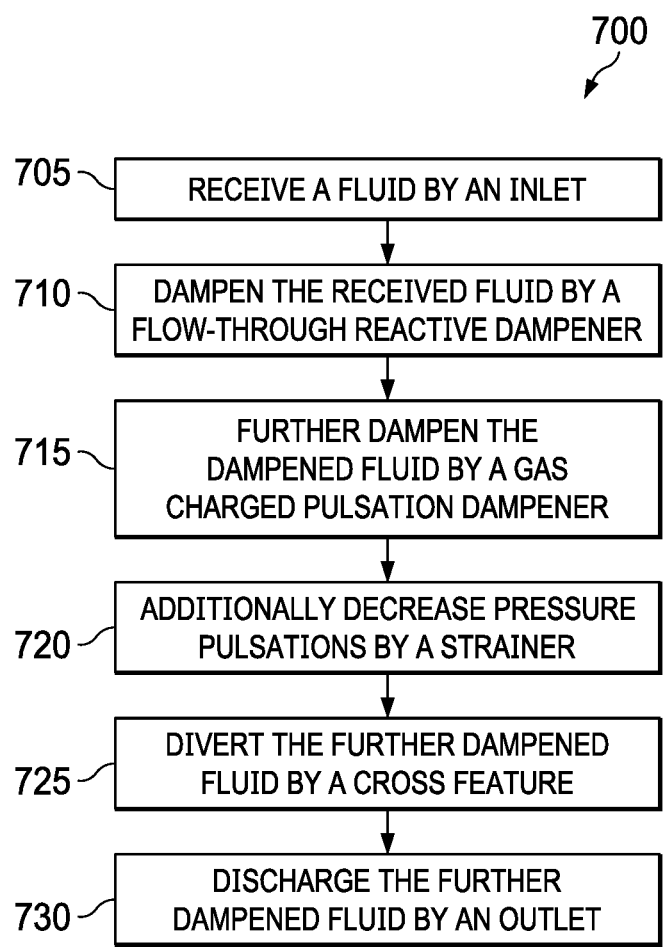
FIG. 7 is a flowchart of a process for a hybrid pulsation dampener in accordance with embodiments of the present disclosure.

FIG. 7 illustrates a process 700 for a hybrid pulsation dampener in accordance with embodiments of the present disclosure. For example, the process depicted in FIG. 7 may be performed by the hybrid pulsation dampener 200 in FIGS. 2A and 2B, the hybrid pulsation dampener 300 in FIGS. 3A and 3B, and the hybrid pulsation dampener 400 in FIG. 4.

In operation 705, the hybrid pulsation dampener 400 receives a fluid through an inlet. The fluid can be mud, oil, gas, etc. The fluid is received from a pump, such as a reciprocating pump, or other pulsation causing device. The fluid can be received from multiple pumps through the cross features. The fluid flows upwards and downwards, from the inlet, through an annulus of the flow-through reactive dampener towards the membrane of the gas charged pulsation dampener.

In operation 710, the hybrid pulsation dampener 400 dampens the received fluid using a flow-through reactive dampener. The flow-through reactive dampener is structured with an internal area to reduce the pressure pulsations with the fluid flow. The flow-through reactive dampener provides a constant ratio of pressure variation across the range of operating pressures for the system. In other words the pressure variation experience through the flow-through reactive dampener is a nearly constant ratio of the current operating pressure, with an increase in operating pressure providing an increase in pressure variation.

In operation 715, the hybrid pulsation dampener 400 further dampens the dampened fluid using a gas charged pulsation dampener. A gas charged pulsation dampener is pre-charged to a level based on the operating pressure, including pre-charging the gas charged pulsation dampener to a pressure levels below a low end or the operating range. While, the low end of the operating range for the isolated gas charged pulsation dampener, where the gas charged pulsation dampener is set to operate, has a smaller pressure variation than an isolated flow-through reactive dampener, the effectiveness of the gas charged pulsation dampener is reduced as the operating pressure increases. In other words, the isolated gas charged pulsation dampener has a greater pressure variation than the isolated flow-through reactive dampener. The combination of both the gas charged pulsation dampener and the flow-through reactive dampener does not experience the same reduction in efficiency or increase in pressure variation that would be expected using a gas charged pulsation dampener without the flow-through reactive dampener.

The gas charged pulsation dampener is mounted to the flow-through reactive dampener in a manner to expose a membrane of the gas charged pulsation dampener to the received fluid flowing through the flow-through reactive dampener. The gas charged pulsation dampener is mounted to the flow-through reactive dampener using bolts or by welding. The flow-through reactive dampener is structured with an internal pressure drop feature or an external pressure drop feature.

In operation 720, the hybrid pulsation dampener 400 additionally decreases pressure pulsations using a strainer. The strainer can be used for removing solid matter in the fluid, but also provides another pulsation dampening structure in the hybrid pulsation dampener.

In operation 725, the hybrid pulsation dampener 400 diverts the further dampened fluid using the cross feature. The cross feature can be used to accept more than a single stream of fluid from additional pumps or be used as additional outlets for the fluids where the pulsations have been reduced.

In operation 730, the hybrid pulsation dampener 400 discharges the further dampened fluid through the outlet. The fluid is output to for use downstream with the pulsations greatly reduced, allowing for more precise measurements and also reduced impact fluctuations normally caused by pulsations. The fluid flows downwards, towards the outlet, through an inner tube away from the membrane.

Although FIG. 7 illustrates an example process 700 for a hybrid pulsation dampener, various changes could be made to FIG. 7. For example, while shown as a series of steps, various steps in FIG. 7 could overlap, occur in parallel, occur in a different order, or occur multiple times.

Although the present disclosure has been described with exemplary embodiments, various changes and modifications may be suggested to one skilled in the art. It is intended that the present disclosure encompass such changes and modifications as fall within the scope of the appended claims.

What is claimed is:

1. A hybrid pulsation dampener, comprising:
an inlet configured to receive a fluid;
a flow-through reactive dampener comprising an outer tube and an inner tube with an annulus therebetween, the flow-through reactive dampener configured to dampen the received fluid;
a gas charged pulsation dampener configured to further dampen the dampened fluid as the dampened fluid flows through the flow-through reactive dampener; and
an outlet for discharging the further dampened fluid, wherein an inner diameter of the inner tube is smaller than an inner diameter of the outlet.

2. The hybrid pulsation dampener of claim 1, wherein the gas charged pulsation dampener is mounted to the flow-through reactive dampener in a manner to expose a membrane of the gas charged pulsation dampener to the received fluid flowing through the flow-through reactive dampener.

3. The hybrid pulsation dampener of claim 2, wherein the gas charged pulsation dampener is mounted to the flow-through reactive dampener using one of bolts or welding.

4. The hybrid pulsation dampener of claim 2, wherein the received fluid flows:
upwards, from the inlet, through the annulus of the flow-through reactive dampener towards the membrane of the gas charged pulsation dampener, and
downwards, towards the outlet, through the inner tube away from the membrane.

5. The hybrid pulsation dampener of claim 1, wherein the inner tube comprises a strainer.

6. The hybrid pulsation dampener of claim 1, wherein the gas charged pulsation dampener is pre-charged at a low end of an operating pressure range.

7. The hybrid pulsation dampener of claim 1, wherein a pressure differential does not experience an efficiency loss that would be associated with the gas charged pulsation dampener when the gas charged pulsation dampener is operated independently and at a high end of the operating range.

8. A hybrid pulsation dampener, comprising:
an inlet configured to receive a fluid;
a flow-through reactive dampener comprising an outer tube and an inner strainer tube with an annulus therebetween, the flow-through reactive dampener configured to dampen the received fluid;
a gas charged pulsation dampener configured to further dampen the dampened fluid as the received fluid flows through the flow-through reactive dampener, wherein the inner strainer tube within the flow-through reactive dampener is configured to additionally decrease pressure pulsations in the further dampened fluid; and an outlet for discharging the further dampened fluid, wherein an inner diameter of the inner strainer tube is smaller than an inner diameter of the outlet.

9. The hybrid pulsation dampener of claim 8, wherein the gas charged pulsation dampener is mounted to the flow-through reactive dampener in a manner to expose a membrane of the gas charged pulsation dampener to the received fluid flowing through the flow-through reactive dampener.

10. The hybrid pulsation dampener of claim 9, wherein the gas charged pulsation dampener is mounted to the flow-through reactive dampener using one of bolts or welding.

11. The hybrid pulsation dampener of claim 9, wherein the received fluid flows:
upwards, from the inlet, through the annulus of the flow-through reactive dampener towards the membrane of the gas charged pulsation dampener, and
downwards, towards the outlet, through the inner strainer tube away from the membrane.

12. The hybrid pulsation dampener of claim 8, wherein a portion of the inner strainer tube is formed by a perforated cylinder.

13. The hybrid pulsation dampener of claim 8, wherein the gas charged pulsation dampener is pre-charged at a low end of an operating pressure range.

14. The hybrid pulsation dampener of claim 8, wherein a pressure differential does not experience an efficiency loss that would be associated with the gas charged pulsation dampener when the gas charged pulsation dampener is operated independently and at a high end of the operating range.

15. A method for dampening pulsations using a hybrid pulsation dampener, comprising:
receiving, by an inlet of the hybrid pulsation dampener, a fluid;
dampening, by a flow-through reactive dampener comprising an outer tube and an inner tube with an annulus therebetween, the flow-through reactive dampener, the received fluid;
further dampening, by a gas charged pulsation dampener of the hybrid pulsation dampener, the dampened fluid as the received fluid flows through the flow-through reactive dampener; and
discharging, by an outlet of the hybrid pulsation dampener, the further dampened fluid.

16. The method of claim 15, wherein:
the gas charged pulsation dampener is mounted to the flow-through reactive dampener in a manner to expose a membrane of the gas charged pulsation dampener to the received fluid flowing through the flow-through reactive dampener; and
the gas charged pulsation dampener is mounted to the flow-through reactive dampener using one of bolts or welding.

17. The method of claim 16, wherein the received fluid flows:
upwards, from the inlet, through the annulus of the flow-through reactive dampener towards the membrane of the gas charged pulsation dampener, and
downwards, towards the outlet, through the inner tube away from the membrane.

18. The method of claim 15, wherein the inner tube comprises a strainer.

19. The method of claim 15, wherein the gas charged pulsation dampener is pre-charged at a low end of an operating pressure range.

20. The method of claim 15, wherein a pressure differential does not experience an efficiency loss that would be associated with the gas charged pulsation dampener when the gas charged pulsation dampener is operated independently and at a high end of the operating range.

* * * * *